(12) United States Patent
Shafiee et al.

(10) Patent No.: US 9,280,548 B2
(45) Date of Patent: Mar. 8, 2016

(54) STORAGE MANAGER

(71) Applicant: Verizon Patent and Licensing Inc., Basking Ridge, NJ (US)

(72) Inventors: Mohammad Reza Shafiee, Ridgefield, CT (US); Stuart McLean, Land O lakes, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 513 days.

(21) Appl. No.: 13/716,311

(22) Filed: Dec. 17, 2012

(65) Prior Publication Data

US 2014/0172926 A1    Jun. 19, 2014

(51) Int. Cl.
*G06F 17/30* (2006.01)
(52) U.S. Cl.
CPC .... *G06F 17/30132* (2013.01); *G06F 17/30091* (2013.01)
(58) Field of Classification Search
CPC .................................................. G06F 17/30017

USPC ...................... 707/813, 999.01, 607; 705/400
See application file for complete search history.

(56) References Cited

U.S. PATENT DOCUMENTS

| | | | |
|---|---|---|---|
| 8,813,245 B1 * | 8/2014 | Corley et al. | 726/27 |
| 2002/0023164 A1 * | 2/2002 | Lahr | 709/231 |
| 2008/0178175 A1 * | 7/2008 | Woundy et al. | 717/178 |
| 2009/0138481 A1 * | 5/2009 | Chatley | G06F 3/0613 |
| 2009/0327244 A1 * | 12/2009 | Rizal | 707/3 |
| 2010/0174825 A1 * | 7/2010 | Wu et al. | 709/231 |
| 2013/0065551 A1 * | 3/2013 | Raleigh et al. | 455/405 |
| 2013/0317936 A1 * | 11/2013 | Hughes | 705/26.5 |
| 2014/0074712 A1 * | 3/2014 | Palmer | G06Q 30/06 705/44 |

* cited by examiner

*Primary Examiner* — Baoquoc To

(57) ABSTRACT

A method may include identifying a media file to be retrieved from storage, transmitting a request for information identifying a location of the media file and identifying the location of the media file. The method may also include forwarding the identified location, transmitting a request for the media file and receiving the request for the media file. The method may further include creating a copy of the media file, storing a first virtual location corresponding to a location of the copy and forwarding a message indicating that the identified media file is available for processing.

18 Claims, 10 Drawing Sheets

STORAGE MANAGER

BACKGROUND INFORMATION

Consumer demand for media is increasing. For example, consumers often watch and/or listen to various media at home, while traveling, at work, etc. As a result, the number of communication channels for delivering media content and the number of different types of devices for playing the content has also increased. In addition, storing large quantities of media content and tracking the stored content has become increasingly difficult for service providers that deliver the media content.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to an infrastructure for allowing customers to submit orders for processing content, such as media content. The infrastructure facilitates processing of the orders and storing of processed content. The infrastructure may also include a storage management component that controls and stores the content in any one of multiple different storage devices/systems. The storage management component manages the stored content and allows various processing systems to access the stored content, without requiring the processing systems to communicate via different protocols associated with the different storage systems. The storage management component also generates reports associated with stored content to allow customers and/or personnel associated with the infrastructure to view detailed information regarding the stored content.

Figure 1:
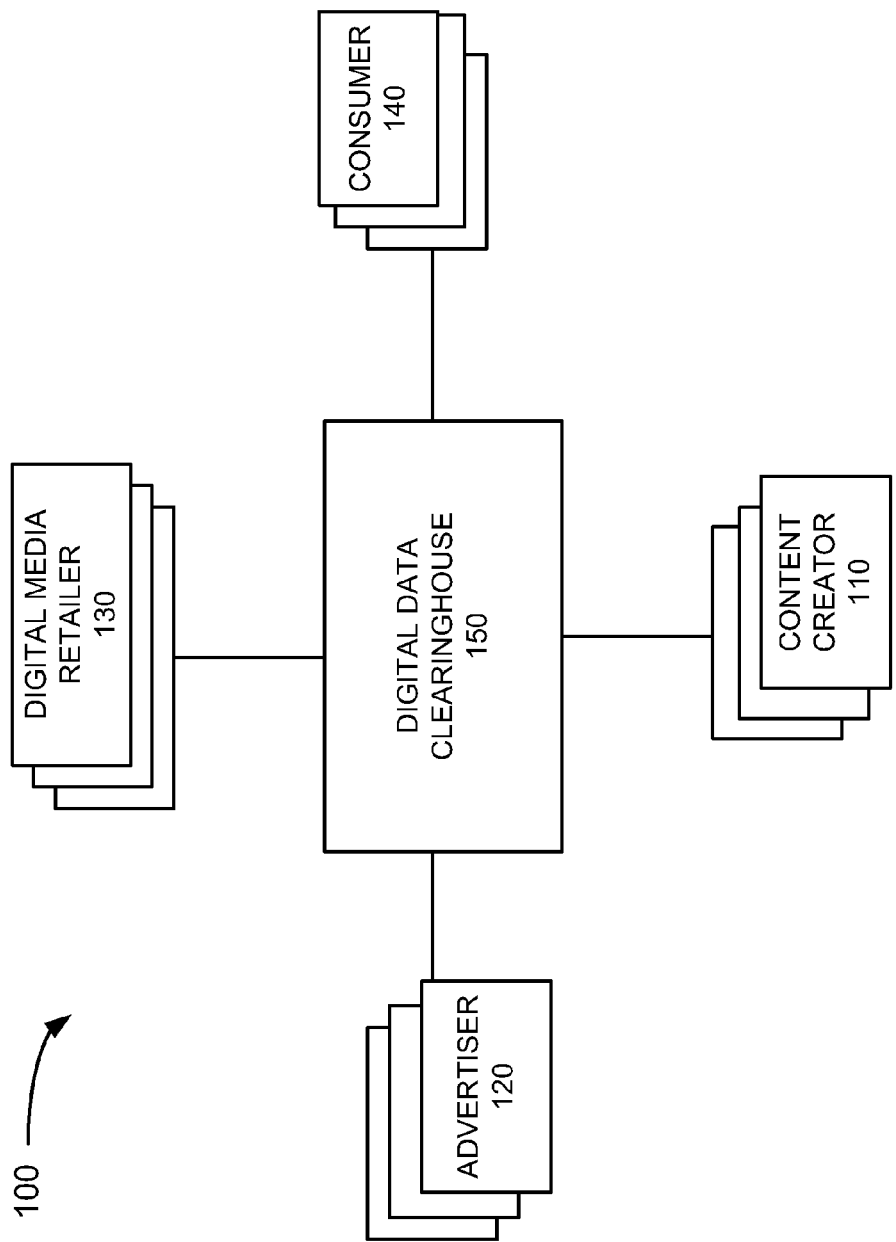
FIG. 1 schematically illustrates an exemplary network in which systems and methods described herein may be implemented.

FIG. 1 is a block diagram of an exemplary network in which systems and methods described herein may be implemented. Referring to FIG. 1, network 100 includes one or more content creators 110, one or more advertisers 120, one or more digital media retailers (DMRs) 130, one or more consumers 140 and digital data clearinghouse (DDC) 150. The exemplary configuration illustrated in FIG. 1 is provided for simplicity. It should be understood that a typical network may include more or fewer devices than illustrated in FIG. 1.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user generated content (UGC), websites, blogsites, etc. Content creators 110 may provide content to DDC 150 for transcoding, packaging and/or distribution, as described in detail below. The terms "content," as used herein, may include any type of media or file, such as video data or files, audio data or files, multimedia data or files, textual data or files, etc. The term "content" may also be referred to herein as "video assets" or "assets."

Advertiser 120 (referred to collectively as advertisers 120 or individually as advertiser 120) may represent one or more parties that wish to insert advertising into media files. For example, advertiser 120 may contract with a content creator 110 and/or digital media retailer 130 to insert an advertisement into a media stream provided to consumers 140. DDC 150 may insert the advertisement into the stream in accordance with the agreement between the parties.

DMR 130 may represent one or more business entities that receive media content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive media content from DDC 150 and sell/provide the content to consumers 140.

Consumer 140 may represent one or more consumers 140 that receive content originally generated by or provided by content creators 110 and that has been processed by DDC 150. For example, DDC 150 may format and package content for distribution by DMRs 130 and/or DDC 150 to consumers 140.

DDC 150 may include a server/computing device or a set of servers/computing devices associated with, for example, processing media content. For example, as described briefly above, DDC 150, also referred to herein as DDC platform 150, may provide an automated environment in which content from content creators 110 is transformed and packaged for distribution in any number of formats, based on the particular requirements associated with DMRs 130. In an exemplary implementation, DDC 150 may also aggregate various data and insert advertisements into the media content. DDC 150, consistent with implementations described herein, may also utilise flexible workflows to streamline the formatting and packaging of content for digital distribution. DDC 150, consistent with implementations described herein, provides for storage of content in any one of a number of storage locations, such as working storage, online storage or offline storage. The multiple storage locations allow for easy retrieval of content when the content is needed. DDC 150 is also able to interface with any type of storage device in a flexible manner that provides for efficient storage and retrieval of content, as described in detail below.

As described above, the exemplary configuration illustrated in FIG. 1 is provided for simplicity. It should be understood that a typical network may include more or fewer devices than illustrated in FIG. 1. For example, it should be understood that network 100 may include a large number (e.g., hundreds or thousands) of different types of user devices associated with consumers 140, such as televisions, cellular telephones, personal computers (PCs), laptop computers, tablet computers, notebook computers, netbook computers, personal digital assistants (PDAs), etc.

It should also be understood network 100 may include one or more wired, wireless and/or optical networks (not shown) that interconnect the components illustrated in FIG. 1 and enable the components in FIG. 1 to communicate with one another. For example, network 100 may include one or more public switched telephone networks (PSTNs) or other type of switched network. Network 100 may also include one or more wireless networks and may include a number of transmission towers for receiving wireless signals and forwarding the wireless signals toward the intended destination. Network 100 may further include one or more satellite networks, one or more packet switched networks, such as an Internet protocol (IP) based network, a local area network (LAN), a wide area network (WAN), an intranet, the Internet, or another type of network that is capable of transmitting data from a source device to a destination device.

Further, various functions are described below as being performed by particular components in network 100. In other implementations, various functions described below as being performed by one device may be performed by another device or multiple devices, and various functions described as being performed by multiple devices may be combined and performed by a single device.

Figure 2:
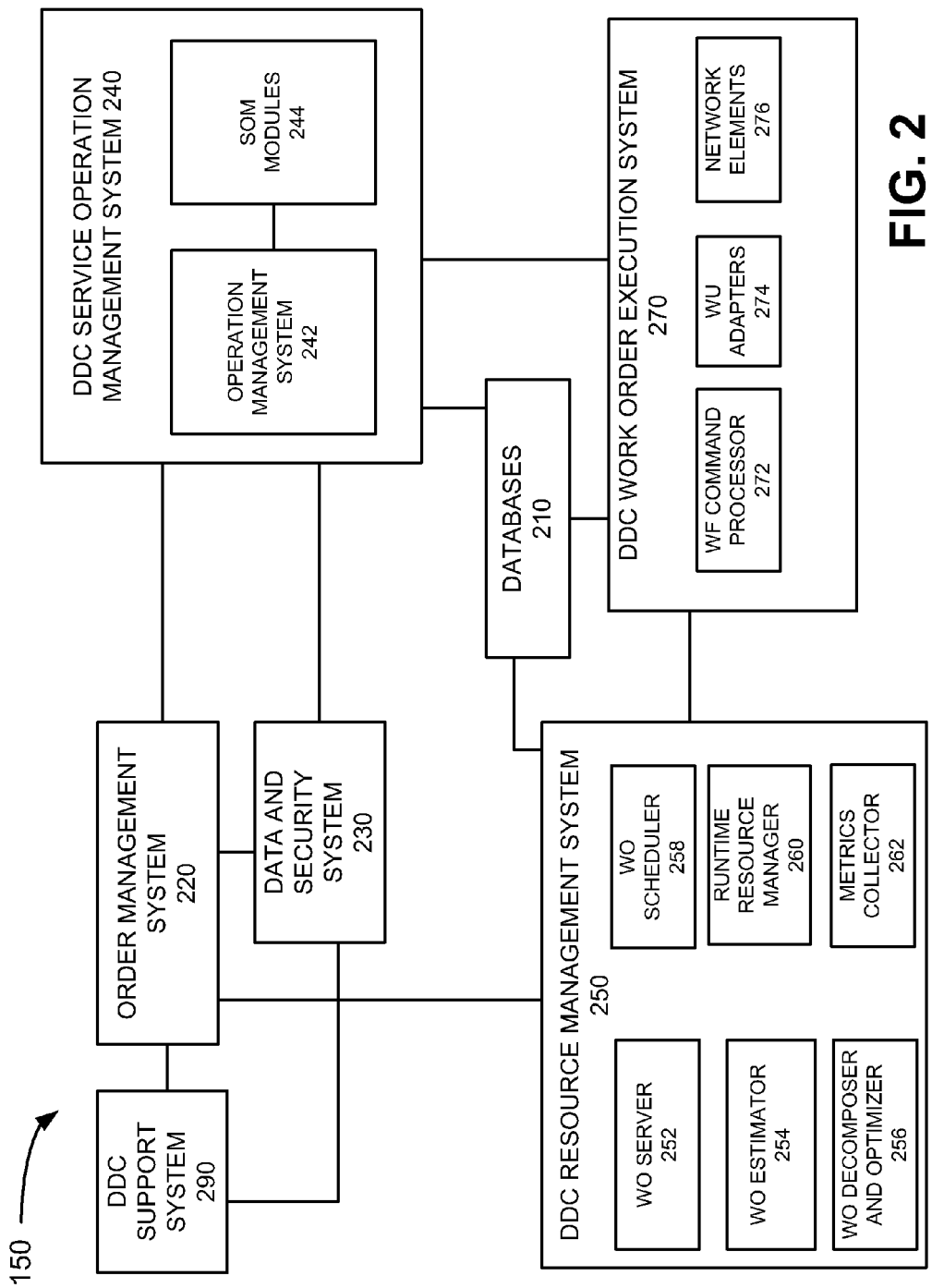
FIG. 2 illustrates an exemplary architecture associated with one of the components of FIG. 1 in which systems and methods described herein may be implemented.

FIG. 2 illustrates an exemplary configuration of a portion of DDC 150. Referring to FIG. 2, DDC 150 may include databases 210, order management system 220, data and security system 230, DDC service operation management (SOM) system 240, DDC resource management system 250, DDC work order execution (WOE) system 270 and DDC support system 290.

Databases 210 may store work unit definitions, workflows, parameters, tables that are associated with various components in DDC 150, intermediate or end results of processing performed by different processes in DDC 150, etc. The term "work unit," as used herein, may refer to a description of a set of one or more operations that a system may perform on content (e.g., overlaying subtitles on a video, inserting advertisements into a video, reformatting a video, etc.).

Order management system 220 may include one or more computing devices or servers for managing customer orders, generating reports, etc. In an exemplary implementation, order management system 220 may include client components that interface with components on DDC service operation management system 240. The client components (e.g., web browser) may receive customer orders, requests for reports, etc., and relay the received information to the components on DDC service operation management system 240 for the creation, validation, estimation, submission, approval, execution and reporting of activities associated with the customer orders, request for reports, etc. For example, a customer order may be completed by sending, to a component on DDC service operation management system 240, a selection of a particular workflow that will drive the processing of content associated with the order. In an exemplary implementation, DDC 150 may include two or more order management systems 220 to facilitate efficient processing of orders, as well as provide redundancy in the event of a problem or failure in one of the order management systems 220.

Data and security system 230 may include one or more computing devices or servers that provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose workflows. In an exemplary implementation, data and security system 230 may interface with order management system 220, DDC SOM system 240 and DDC support system 290.

DDC service operation management (SOM) system 240 may include one or more servers or computing devices to control the overall operation, configuration, and management of DDC 150. For example, DDC SOM system 240 may include operation management system 242 and SOM modules 244. Via a client component that communicates with operation management system 242, a user may control the configuration, administration and operation of DDC 150. For example, in one implementation, via a web browser or another client application, a user may control security, compose a workflow, administer accounts that are associated with content creator 110 or DMR 130, submit a work order, add data and storage to DDC 150, manage resources, manage DDC configuration (e.g., create a work unit), manage catalogs of content, run reports, monitor DDC work order (e.g., information associated with a work order), etc.

In providing each of such services to a client, operation management system 242 may employ SOM modules 244. SOM modules 244 may include components/modules that correspond to the above-listed services. For example, SOM modules 244 may include a security manager, workflow manager, account manager, work order manager, asset manager, data and storage manager, resource management module, configuration manager, asset management module, catalog management module, monitoring and reporting module, etc. DDC SOM system 240 may further include an operational graphical user interface (GUI) for interfacing with SOM modules.

DDC resource management system 250 may include one or more servers or computing devices that support the capacity management of resources associated with network elements (NEs) in DDC 150. As illustrated in FIG. 2, DDC resource management system 250 may include work order (WO) server 252, WO estimator 254, WO decomposer and optimizer 256, WO scheduler 258, runtime resource manager 260 and metrics collector 262. Components 252-262 may aid in scheduling and allocating resources associated with fulfilling customer orders, as described in detail below.

WO server 252 may provide work order-related interfaces to operation management system 242 and/or SOM modules 244, and may communicate with WO estimator 254, WO decomposer and optimizer 256, and WO scheduler 258 to submit, decompose, validate, and save work orders, and to estimate, schedule, and reserve resources during the order submission.

Work order estimator 254 may estimate the cost of completing a decomposed work order across work units of a workflow, based on resources that are associated with the work units for each resource type. Work order estimator 254 may store the cost in one of databases 210 in terms of resource capacity units (RCUs) and duration of time required to complete tasks or processes that are associated with the work order.

WO decomposer and optimizer 256 may break down an order into work units based on the workflow associated with the order. Furthermore, based on the decomposition, WO decomposer and optimizer 256 may generate work unit tasks, or simply "tasks," assign task parameters, and create task connectors, which are described below.

WO scheduler 258 may match cost estimates for different resource types for a work order to available time slots in an allocation schedule across different network elements (e.g., hardware/software components that perform underlying operations for a work unit). As a result of the scheduling, WO scheduler 258 may output start and end times for each of the work unit tasks and for resource reservations.

Runtime resource manager 260 may allocate network elements (NEs) and/or user groups (UGs) to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous actual execution measurements, metrics collector 262 may modify factors that are used to estimate the resource and time necessary to complete a task associated with a work unit for a particular asset.

In an exemplary implementation, resource management system 250 may represent the functions performed by various NEs used to execute work order tasks as resource types and represent the capacity of the NEs using resource capacity units (RCUs). The term "resource type," as used herein, may include categories of consumable network resources used to schedule, reserve, bill and manage network capacity. Examples of resource types include bandwidth, storage, the ability to transcode an asset from one format into another format. Resource types may also include resources associated with humans involved in the processing of assets, such as a human's ability to review a movie asset, etc. The term "RCU", as used herein, may include the unit of measure for a resource type. Examples of RCUs include megabits for bandwidth, gibabytes for storage, transcoding task units and/or CPU processing time for transcoding operations, etc. In an exemplary implementation, DDC 150 may include two or more resource management systems 250 to facilitate managing execution of orders, as well as provide redundancy in the event of a problem or failure in one of the resource management systems 250, as described in detail below.

DDC work order execution (WOE) system 270 may include one or more servers or computing devices to manage the flow and execution of work units of a defined workflow associated with a work order. DDC WOE system 270 may include a workflow (WF) command processor 272 (also referred to herein as command processor 272), work unit (WU) adapters 274, and network elements 276. For simplicity, FIG. 2 does not show other components of WOE system 270. Depending on the implementation, DDC WOE system 270 may include additional, fewer, or different components than those illustrated in FIG. 2. For example, WOE system 270 may include a work unit processor (not shown).

Command processor 272 may drive work order execution. Command processor 272 may include a WO manager and WO processor. The WO manager may provide interfaces to resource management system 250 for initiating an execution of a work order, retrieving the status of the work order, suspending/resuming the work order execution, canceling the work order, etc. The WO processor may coordinate work unit tasks for completion of a work order. In coordinating different work unit tasks, the WO processor may sequence the tasks for optimum execution time and resource utilization. The WO processor may communicate with runtime resource manager 260 for allocation and de-allocation of resources. The work unit processor may dispatch processes/threads to perform a work unit task.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for processing media content. In an exemplary implementation, DDC 150 may include two or more work order execution systems 270 to provide for efficient processing or work orders, as well as provide redundancy in the event of a problem or failure in one of the work order execution systems 270, as described in detail below.

DDC support system 290 may include one or more servers or computing devices and/or personnel to provide support services, such creation of work units, composition of workflows, etc., billing support, contracting management, pricing, etc.

The configuration shown in FIG. 2 is for illustrative purposes. In other configurations and/or implementations, functions that are associated with one component or system shown in FIG. 2 may be performed by one or more other components in FIG. 2, any of the components may be connected to any other of the components, and functions of one component may be included in another component. Accordingly, in the other configurations or implementations, DDC 150 may include additional, fewer, different, or a different arrangement of components than those illustrated in FIG. 2. For example, as discussed briefly above, DDC 150 may include multiple ones of the systems illustrated in FIG. 2 to provide for redundancy when a problem occurs. In some implementations, the multiple components may be located at different physical sites, discussed in further detail below.

As described above, DDC 150 may be used to package and distribute content, provided by content creators 110, to consumers 140 via a number of different communication channels and having a number of different formats. As also described briefly above, DDC SOM system 240 may include a storage manager and storage components that are implemented using a flexible architecture that dynamically uses internal storage components (e.g., storage components located internally with respect to DDC 150) and external storage components (e.g., storage components connected to the storage manager via "cloud services," such as via a network located externally from DDC 150) to efficiently allocate storage, as well as enable the storage manager to interface/communicate with any type of storage resource, add storage resources, move content between storage components, etc., as described in detail below.

Figure 3:
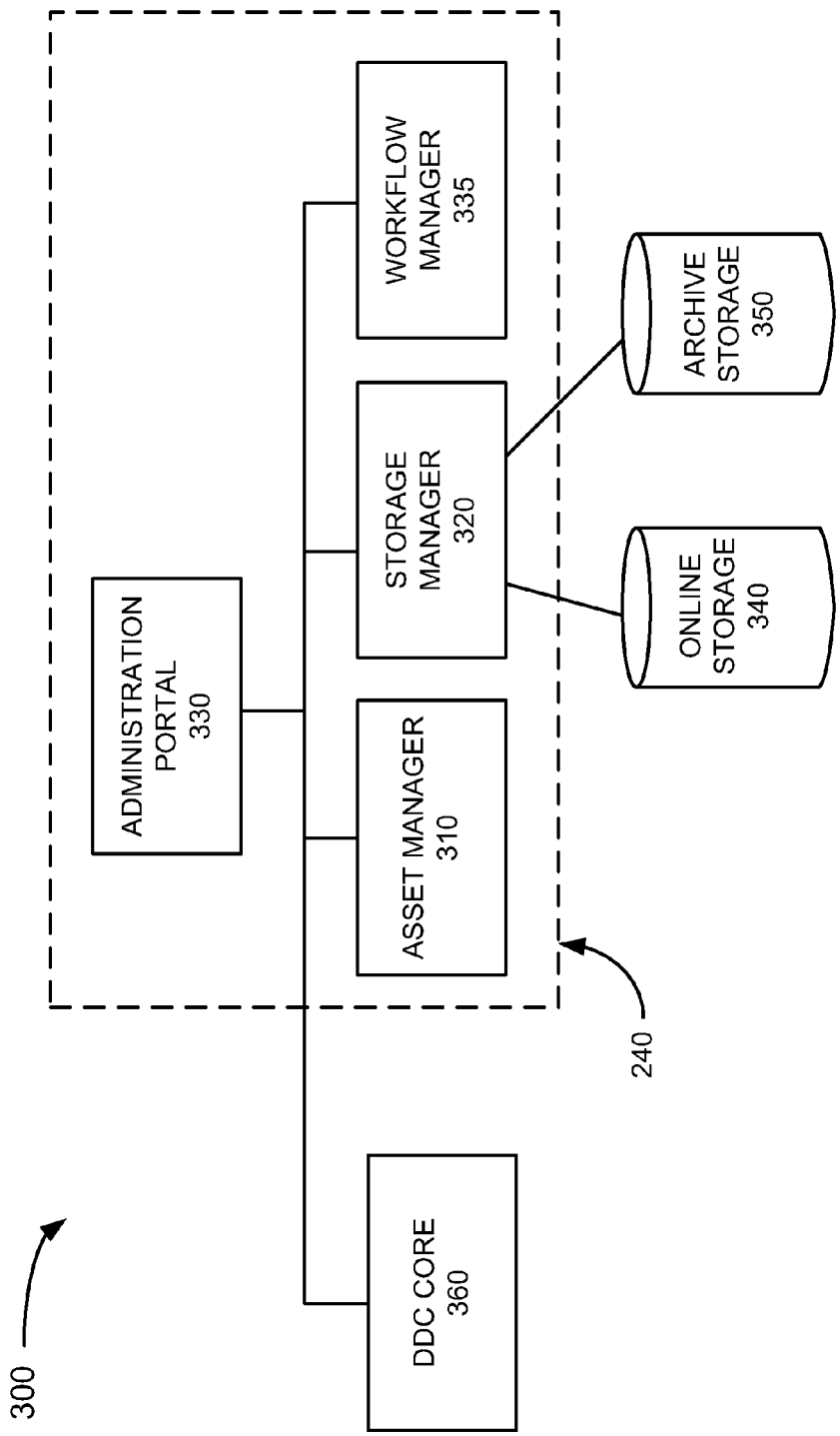
FIG. 3 illustrates an exemplary configuration of components implemented in the architecture of FIG. 2.

FIG. 3 illustrates an exemplary system/architecture 300 associated with a portion of DDC 150 consistent with implementations described herein. Referring to FIG. 3, system 300 includes asset manager 310, storage manager 320, administration portal 330, workflow manager 335, online storage system 340 (also referred to as online storage), archive storage system 350 (also referred to as archive storage 350) and DDC core 360. In an exemplary implementation, asset manager 310, storage manager 32, administration portal 330 and workflow manager 335 may be part of DDC SOM system 240, described above with respect to FIG. 2. DDC core 360 may correspond to the portions of DDC 150 that are not illustrated in FIG. 3 (e.g., databases 210, order management system 220, data and security system 230, DDC resource management system 250, DDC work order execution system 270, DDC support system 290, etc.).

Asset manager 310 may interface with DDC core 360, storage manager 320, administration portal 330 and workflow manager 335. Asset manager 310 may maintain separate asset records for each asset stored in multiple storage systems/locations. Asset manager 310 may also store virtual locations of assets, as described in detail below.

Storage manager 320 may provide a unified platform to manage the daily storage operations of DDC 150. For example, storage manager 320 may interface with DDC core 360, asset management systems (e.g., asset manager 310), administration portals (e.g., administration portal 330), workflow management systems (e.g., workflow manager 335) and local, online, offline and cloud storage systems (e.g., online storage 340 and archive storage 350). Storage manager 320 may also include a rules management component/logic for managing the storage rules and a storage management component/logic for managing storage administration and reporting functions, as described in detail below.

Administration portal 330 may allow administrative personnel to interact with asset manager 310 and storage manager 320. For example, administration portal 330 may include a computer, workstation or other computing device that provides a user interface, such as a graphical user interface (GUI), that allows personnel to monitor the status of various orders, determine the location of assets (e.g., in online storage 340, archive storage 350, etc.), determine content file sizes, available storage capacity, amount of storage used, etc., provide instructions for adding new storage components, request reports regarding storage of assets, etc.

Workflow manager 335 may interface with asset manager 310, storage manager 320 and administration portal 330 to aid in scheduling tasks associated with moving data to/from DDC core 360. For example, workflow manager 335 may interface with or include data moving logic that aids in moving assets based on requests and/or requirements associated with storage manager 320.

Online storage 340 may store assets processed by DDC 150. For example, online storage system 340 may store assets processed by DDC core 360 for various customers. In an exemplary implementation, online storage 340 may be located internally with respect to DDC 150. For example, online storage 340 may connect to other components in DDC 150 directly or via a network located internally with respect to DDC 150.

Archive storage 350 may store assets processed by DDC 150. For example, archive storage 350 may store assets processed by DDC core 360 that are not expected to be used as frequently as assets stored in online storage 340. In an exemplary implementation, archive storage 350 may be located externally with respect to DDC 150. For example, archive storage 350 may connect to other components in DDC 150 via the "cloud" (e.g., a network, such as the PSTN, the Internet, or another network, located externally with respect to DDC 150).

Online storage system 340 and archive storage system 350 are depicted as single storage systems. In an exemplary implementation, online storage system 340 may include multiple different storage devices/systems (e.g., storage devices manufactured by different companies, storage devices of various sizes, etc.). Similarly, archive storage system 350 may include multiple different storage devices/systems. In each case, storage manager 320 may interact with online storage system 340 and archive storage system 350 to move assets between online storage system 340 and archive storage system 350, as well as move ingested content and retrieve ingested content based on customer orders and/or requests from DDC core 360, as described in detail below.

Figure 4:
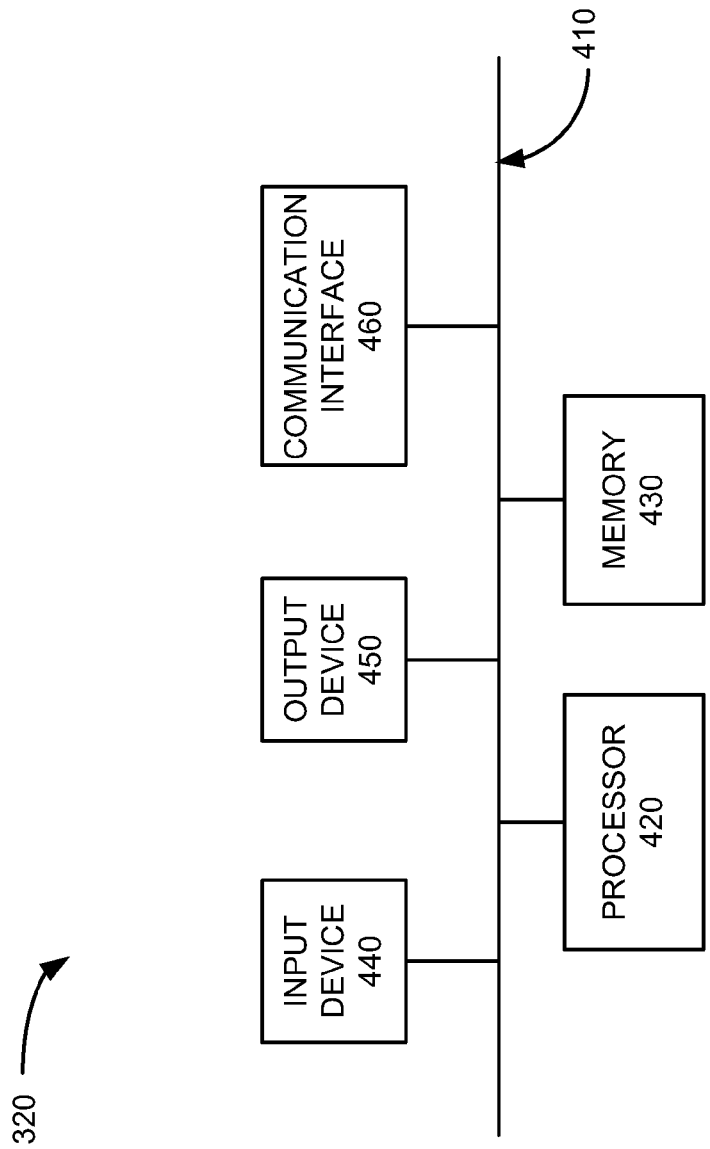
FIG. 4 illustrates an exemplary configuration of one of more of the components of FIG. 3.

FIG. 4 illustrates an exemplary configuration of one or more devices on which components illustrated in FIG. 3, such as storage manager 320, may be implemented. Other components in system 300, such as asset manager 310, administration portal 330, workflow manager 335, online storage system 340, archive storage system 350 may be implemented via one or more devices configured as illustrated in FIG. 4. In addition, other components in DDC 150, such as components in order management system 220, data and security system 230, DDC SOM system 240, DDC work order execution system 270 and DDC support system 290 may be configured in a similar manner. Referring to FIG. 4, storage manager 320 may include bus 410, processor 420, memory 430, input device 440, output device 450 and communication interface 460. Bus 410 may include a path that permits communication among the elements of storage manager 320.

Processor 420 may include one or more processors, microprocessors, or processing logic that may interpret and execute instructions. Memory 430 may include a random access memory (RAM) or another type of dynamic storage device that may store information and instructions for execution by processor 420. Memory 430 may also include a read only memory (ROM) device or another type of static storage device that may store static information and instructions for use by processor 420. Memory 430 may further include a solid state drive (SDD). Memory 330 may also include a magnetic and/or optical recording medium (e.g., a hard disk) and its corresponding drive.

Input device 440 may include a mechanism that permits a user to input information to storage manager 320, such as a keyboard, a keypad, a mouse, a pen, a microphone, a touch screen, voice recognition and/or biometric mechanisms, etc. Output device 450 may include a mechanism that outputs information to the user, including a display, a printer, a speaker, etc.

Communication interface 460 may include a transceiver for communicating with other devices within system 300 or outside system 300 via wired, wireless or optical mechanisms. Communication interface 460 may also include one or more radio frequency (RF) transmitters, receivers and/or transceivers and one or more antennas for transmitting and receiving RF data via network 100. Communication interface 460 may also include a modem or an Ethernet interface to a LAN or other mechanisms for communicating with elements in a network or system, such as network 100, DDC core 360 or another network/system.

The exemplary configuration illustrated in FIG. 4 is provided for simplicity. It should be understood that storage manager 320 (or other devices in system 300) may include more or fewer devices than illustrated in FIG. 4. In an exemplary implementation, one or more components of storage manager 320 may perform operations in response to processor 420 executing sequences of instructions contained in a computer-readable medium, such as memory 430. A computer-readable medium may be defined as a physical or logical memory device. The software instructions may be read into memory 430 from another computer-readable medium (e.g., a hard disk drive (HDD), SSD, etc.), or from another device via communication interface 460. Alternatively, hard-wired circuitry may be used in place of or in combination with software instructions to implement processes consistent with the implementations described herein. Thus, implementations described herein are not limited to any specific combination of hardware circuitry and software.

As described above, storage manager 320 may include logic components for managing and controlling storage requirements associated with DDC 150. As such, storage manager 320 may include interfaces for communicating with other components of system 300 and/or DDC 150, as described in detail below.

Figure 5:
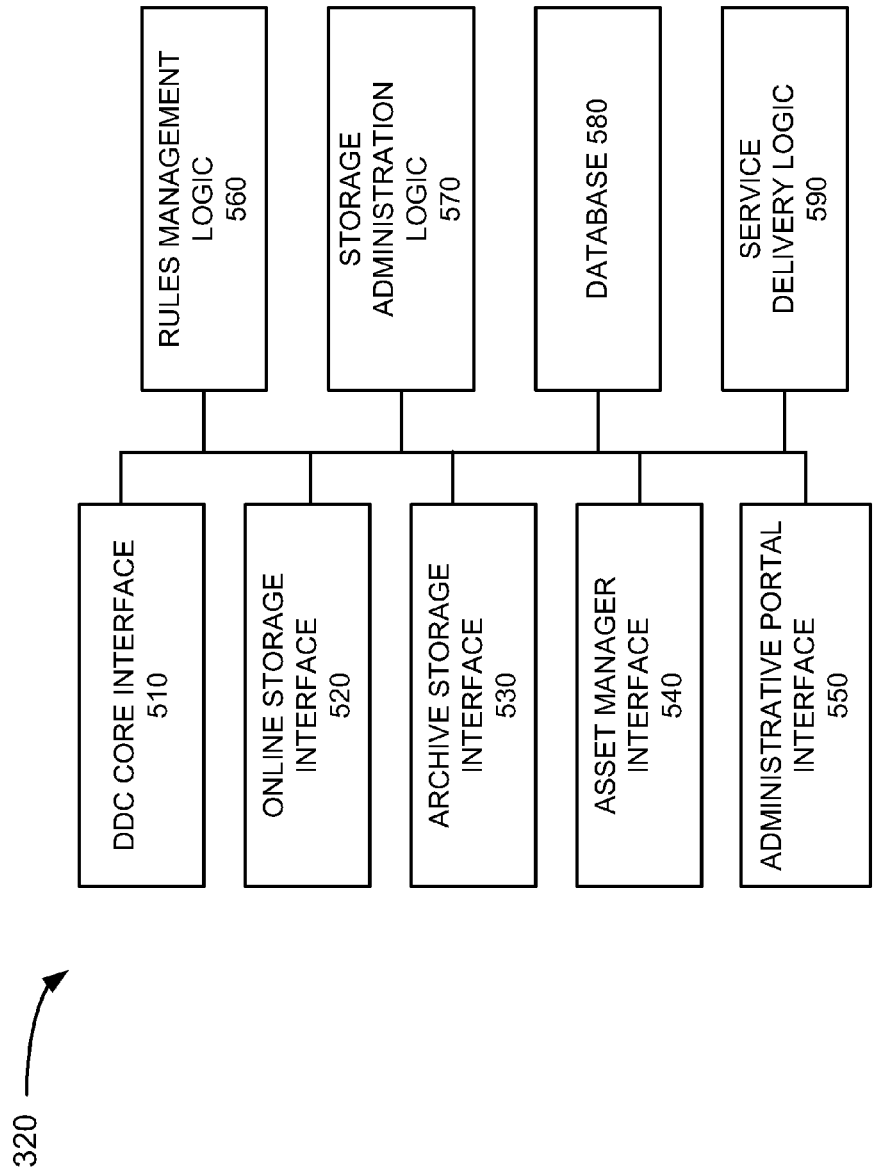
FIG. 5 illustrates exemplary logic components implemented in the storage manager of FIG. 3.

FIG. 5 illustrates exemplary logic components implemented in storage manger 320. In an exemplary implementation, storage manager 320 may include DDC core interface 510, online storage interface 520, archive storage interface 530, asset manager interface 540, administrative portal interface 550, rules management logic 560, storage administration logic 570, database 580 and service delivery logic 590.

DDC core interface 510 provides an interface to DDC core 360 and enables storage manager 320 to provide storage services for DDC core 360. For example, DDC core interface 510 may allow storage manager 320 to receive content from DDC core 360 for storage and retrieve content from storage for forwarding to DDC core 360. In an exemplary implementation, DDC core interface 510 allows storage manager 320 to provide secure web services to receive requests from DDC core 360 to ingest content received at a "landing pad" and store the content in "mezzanine storage," to move content from mezzanine storage to "working storage" and to move content from working storage to a distribution pad. The term "landing pad" may refer to a temporary location in which incoming content is stored and the term "working storage" may refer to a temporary location in which content being retrieved is stored while awaiting further processing. The term "mezzanine storage" may refer to online storage 340 in which assets recently processed by DDC core 360 may be stored. The term "distribution pad" may refer to a temporary location where content awaiting distribution to customers or distribution to other systems in DDC core 360 is stored.

DDC core interface 510 also allows storage manager 320 to archive content from mezzanine storage to archive storage 350 (also referred to as offline storage 350), archive content from working storage to archive storage 350, retrieve content from archive storage 350 and move the retrieved content to working storage. DDC core interface 510 further allows storage manager 320 to receive content delete requests from DDC core 360, as well as synchronize business rules store in DDC core 360 with rules stored in rules management logic 560 through a real time automated interface feed.

DDC core interface 510 may use publish-subscribe messaging types using messaging standards, such as Java Message Service (JMS) or Message Queue (MQ). Further, DDC core interface 510 may be scalable and deployable in a load balanced and fault tolerant mode that includes a backup interface which can be used if the primary DDC core interface 510 fails. DDC core interface 510 also enables storage manager 320 to obtain the status of the request (e.g., in process, complete, started, etc.). DDC core interface 510 may further allow storage manager 320 to log all requests received via DDC core 360, log synchronization interface errors and provide notification to operation personnel within a predetermined time (e.g., 30 seconds) of an error occurrence, as well as log an error message if storage manager 320 fails to process a request from the DDC core 360.

Online storage interface 520 provides an interface to online storage 340. Online storage interface allows storage manager 320 to control online storage components in system 300. For example, online storage interface 520 allows storage manager 320 to move content from the landing pad to mezzanine storage, move content form mezzanine storage to working storage and move content from working storage for distribution via DDC core 360. Online storage interface 520 also allows storage manager 320 to delete content from online storage 340 and working storage.

Archive storage interface 530 provides an interface with archive storage 350. Archive storage interface 350 allows storage manager 320 to archive content by moving content from mezzanine storage and/or working storage to archive storage 350. Archive storage interface 530 also allows storage manager 320 to retrieve content from archive storage 350 and delete content stored in archive storage 350.

Asset manager interface 540 allows storage manager 320 to interface with asset manager 310. For example, asset manager interface 540 allows storage manager 320 to retrieve virtual location information and provide virtual location information to asset manager 310. Asset manager interface 540 also allows asset manager 310 to query storage manager 320 with asset metadata, such as title, name, asset ID, last accessed date, etc. Asset manager interface 540 may also allow storage manager 320 to pool physical storage from multiple network storage devices and present the pool storage as a single storage system to asset manager 310.

For example, as discussed above, online storage 340 and archive storage 350 may each include multiple different storage devices and/or systems. Storage manager 340 may logically group the different storage systems into types (e.g., online storage, offline/archive storage) and allow asset manager 310 to request information regarding a type of storage system.

Administration portal interface 550 allows storage manager 320 to provide services for storage portal functions. For example, administration portal interface 550 allows administration portal 330 to query storage manager 320 to provide the status of pending archival requests and content retrieval requests. Administration portal interface 550 also allows administration portal 330 to instruct storage manager 320 to allocate storage space per account and de-allocate storage space per account. Administration portal interface 550 further allows administration portal 330 to query storage manager 320 to determine the number of bytes of content stored per customer, the number of bytes of content stored per storage type (e.g., online storage 340, archive storage 350), etc.

Rules management logic 560 may store business rules and policies for routing content to appropriate storage system, such as online storage 340, archive storage 350, etc. For example, rules management logic 560 may store a rule indicating that storage manager 320 is to automatically move an asset from online storage 340 to archive storage 350 if the asset has not been accessed in a predetermined period of time (e.g., 10 days, 30 days, etc.). Rules management logic 560 may store another rule indicating that an asset is to be deleted from working storage if the asset has not been accessed within a predetermined period of time (e.g., 2 days, 5 days, etc.). Rules management logic 560 may store another rule indicating that an asset is to be deleted from online storage 340 or archive storage 350 if the asset has not been accessed within a predetermined period of time (e.g., 6 months, one year, etc.). Rules management logic 560 may store still another rule indicating that an asset is to be deleted from the distribution pad if the asset has not been accessed within a predetermined period of time (e.g., 2 days, 5 days, etc.).

Rules management logic 560 may store additional rules that provide for the efficient storage of content. For example, rules management logic 560 may store cost information identifying the cost of storing content in online storage 340 versus archive storage 350. Based on the cost information and/or customer requirements associated with the customer's content, rules management logic 560 may store rules providing for the automatic movement of content from online storage 340 to offline storage 350 to minimize the cost associated with storing the content.

Storage administration logic 570 may identify and analyze the storage of all assets in DDC 150. Storage administration logic 570 may also automatically generate reports associated with the storage of assets, including reports identifying the configuration of all storage components and all assets within DDC 150. In an exemplary implementation, storage administration logic 570 may track the number of bytes stored per customer, the number of bytes per storage type (e.g., mezzanine, working storage, archive storage). Storage administration logic 570 may receive queries from personnel via administration portal 330. For example, administration portal 330 may provide a graphical user interface (GUI) that allows personnel to query storage administration logic 570 to generate various reports, such as generate analytic information or reports that indicate byes stored, bytes retrieved, content frequently accessed by account, etc.

Storage administration logic 570 may also allocate and de-allocate storage space per account, track the status of each retrieval request in real time and track the status of each archival request in real time. Storage administration logic 570 may further allow an administrator to update or change the names of archived assets.

Database 580 may store storage related information. For example, database 580 may store some or all of the business rules discussed above with respect to rules management logic 570. Database 580 may also store physical addresses of stored assets. The physical addresses may identify the particular storage device/system in which each asset is stored, as well as a particular location within the storage device/system. Database 580 may further store asset metadata, such as proprietary object identifiers (IDs) associated with content, asset IDs, storage uniform resource identifiers (URIs) identifying locations of stored assets, etc. Database 580 may also store storage keys (e.g., tokens) returned by various storage devices/systems upon storing an asset. The keys may be used by storage manager 320 when subsequently retrieving as asset.

Service delivery logic 590 may include logic for delivering assets to/from the appropriate storage locations. For example, service delivery logic 590 may interface with workflow manager 335 to move assets based on requests from DDC core 360 and/or requirements stored in rules management logic 560 and storage administration logic 570. Service delivery logic 590 may include scheduling logic to deliver assets to the appropriate locations at the appropriate times.

Figure 6:
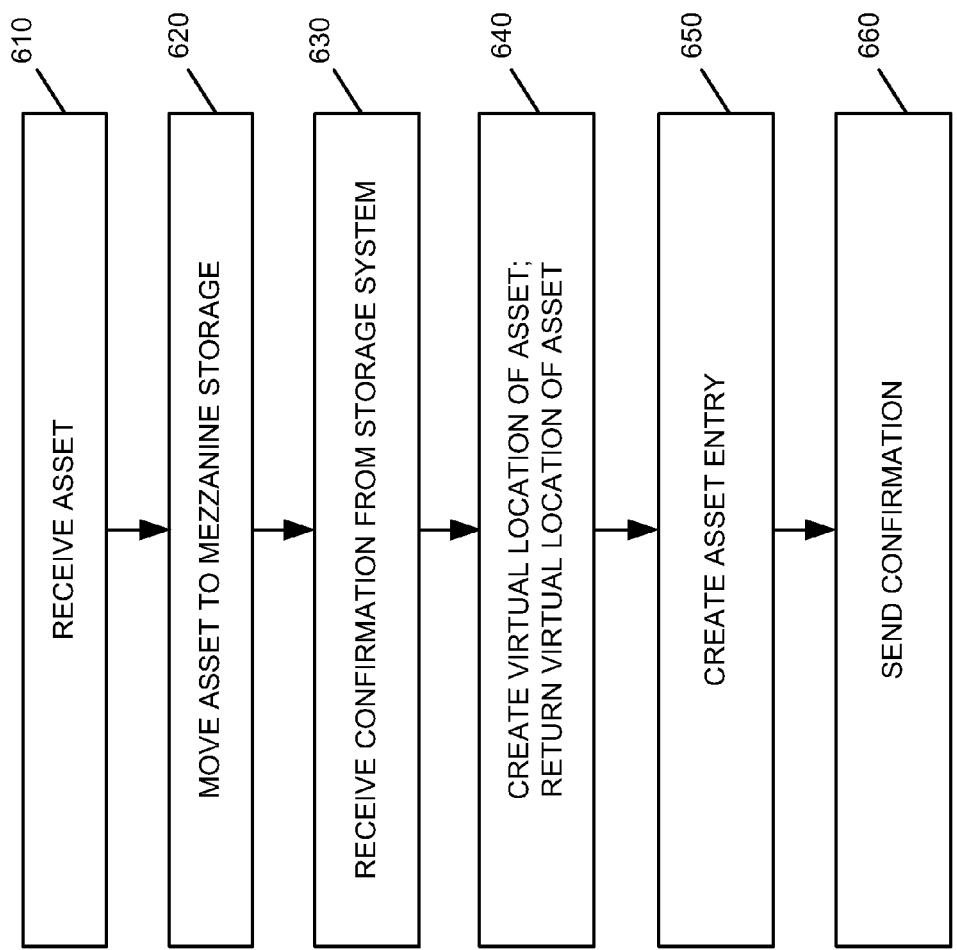
FIG. 6 is a flow diagram illustrating exemplary processing associated with storing content.
Figure 7:
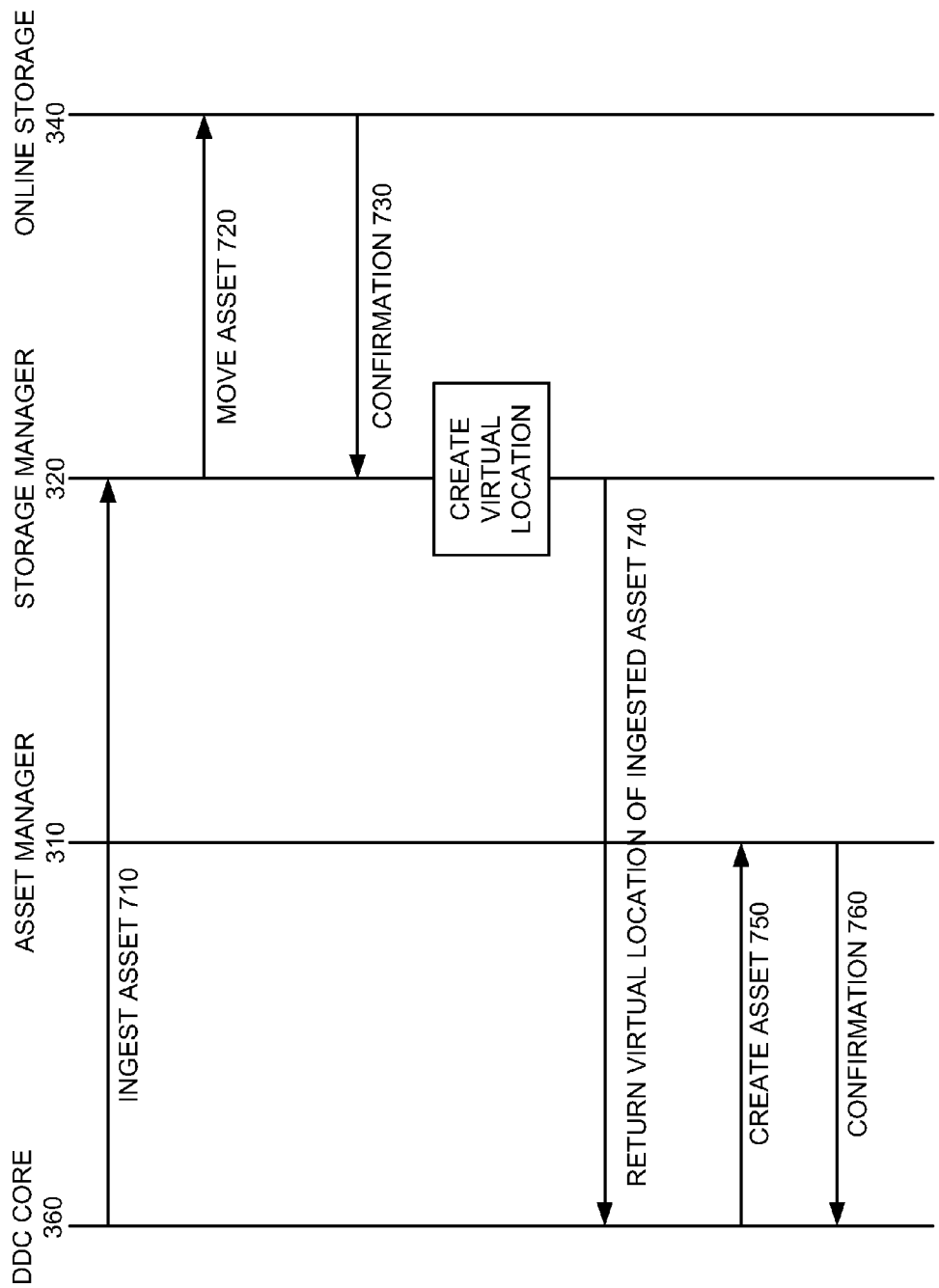
FIG. 7 is a signal flow diagram associated with the processing of FIG. 6.

As described above, storage manager 320 may manage the storage, retrieval and tracking of assets associated with DDC 150. For example, FIG. 6 is an exemplary flow diagram illustrating processing associated with ingesting content by DDC 150. FIG. 7 is a signal flow diagram associated with the processing of FIG. 6 and is described in conjunction with FIG. 6. Processing may begin with storage manager 320 receiving an asset from DDC core 360 (FIG. 6, block 610). For example, DDC 150 may process an asset, such as transcode an asset received in a first format to another format, in accordance with a customer's requirement. After processing the asset in accordance with the customer's requirement, DDC core 360 may invoke a web services call to storage manager 320 to ingest the processed asset (FIG. 7, 710).

The asset may be received by storage manager 320 in the landing pad area of storage manager 320. As described above, the landing pad may correspond to a temporary storage location for incoming assets. In an exemplary implementation, rules management logic 560 may indicate that incoming assets are to be stored in online storage 340, as opposed to archive storage 350. In this implementation, storage manager 320 may move the asset from the landing pad to mezzanine/online storage 340 (block 620). For example, storage manager 320 may invoice a web services call to online storage 340 to move the asset to online storage 340 (720).

Upon successful movement of the asset to online storage 340, online storage 340 provides a confirmation message to storage manager 320 (730). In an exemplary implementation, online storage 340 may send a confirmation message that includes information specifying the physical location of the ingested content. That is, the confirmation message includes location information identifying the particular storage device or system and a location within that storage device or system in which the content is stored.

Storage manager 320 may receive the confirmation message from online storage 340 via online storage interface 520 (block 630). Storage manager 320 may create a virtual location for the ingested asset (block 640). For example, storage administration logic 570 may create a virtual location for the ingested content and associate the virtual location with the actual physical location of the ingested content stored in online storage 340. The virtual location may allow storage manager 320 to provide a simplified process in which other components of DDC 150 can refer to a stored asset without having to refer to a particular storage device in which the content may be stored and/or without having to be aware of the particular storage device in which the content is stored. Storage manager 320 may forward the virtual location of the ingested content to DDC core 360 (block 640). For example, storage manager 320 may forward the virtual location via DDC core interface 510 to DDC core 360 (740).

Upon receiving the information identifying the virtual location of the content, DDC core 360 may instruct asset manager 310 to create an asset entry in its database for the ingested content (750). For example, DDC core 360 may invoke a web services call to asset manager 310 requesting that asset manager 310 create an asset entry and store the asset entry in its database.

Asset manager 310 receives the request and creates the asset entry (block 650). Upon successful creation of the asset entry, asset manager 310 sends a confirmation to DDC core 360 indicating that the asset entry has been created and stored (block 660, 760). Creating an asset entry for each asset allows asset manager 310 to be aware of all assets stored by storage manager 320.

In this manner, components of DDC core 360 may communicate with storage manager 320 to store an asset. As described above, components of DDC core 360 do not need to know the particular type of storage device in which the asset will be stored and do not need to be aware of any protocols associated with communicating with the actual storage device. In other words, details of the storage process and/or protocols associated with various storage systems are invisible to various processing components in DDC core 360 that process orders and retrieve content. This allows for a very efficient storage process for assets in DDC 150.

In some implementations, an ingested asset may be archived directly to offline storage 350. For example, in some cases, DDC core 360 may forward a processed asset that is not expected to be used for a relatively long period of time (e.g., 60 days, 180 days, etc.). In this case, the processing may proceed in a similar manner as described above with respect to FIG. 6 and FIG. 7. That is, DDC 360 may forward an asset to storage manager 320 for processing. However, in this scenario, DDC core 360 may request that the asset be stored in archive storage 350. Storage manager 320 may then process the request in a similar manner as described above with respect to FIGS. 6 and 7, but with the exception being that storage manager 320 stores the asset in archive storage 350 (as opposed to online storage 340). Storage manager 320 may also create a virtual location for the stored asset and return the virtual location to DDC core 360, as described above with respect to FIGS. 6 and 7. DDC core 360 may also interact with asset manager 310 to instruct asset manager 310 to create an asset entry in asset manager 310's database that stores the virtual location information, as described above with respect to FIGS. 6 and 7.

Figure 8:
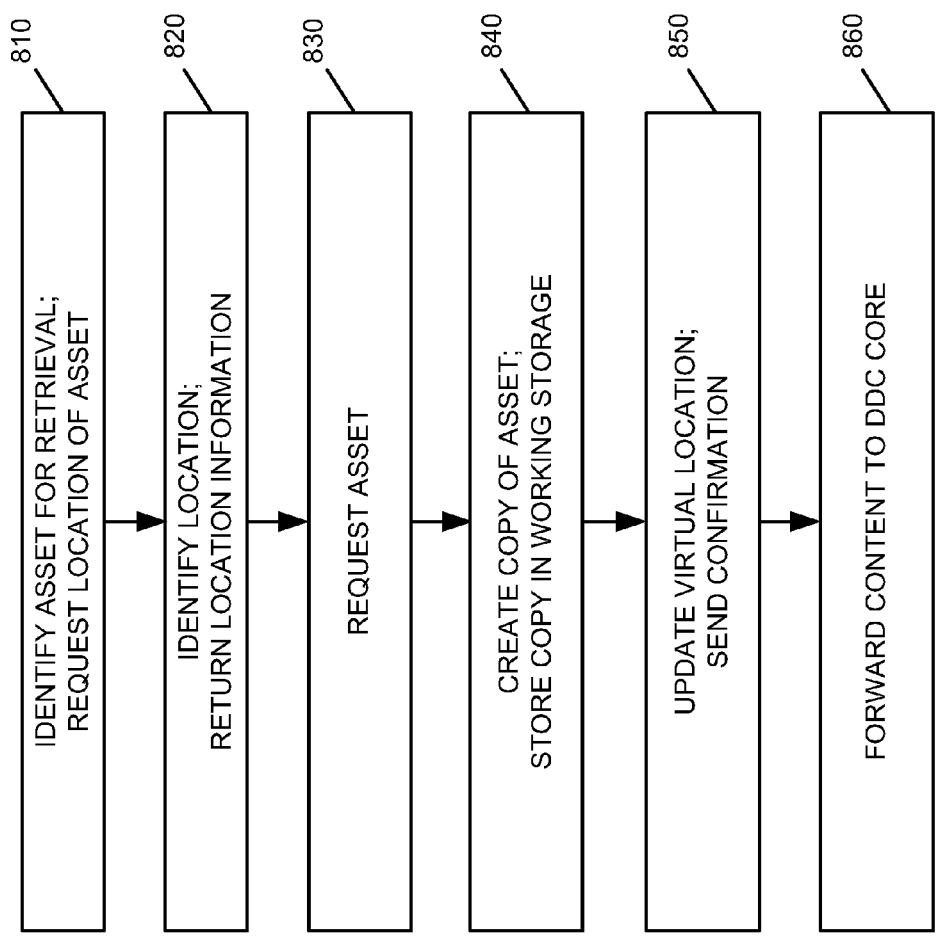
FIG. 8 is a flow diagram illustrating exemplary processing associated with retrieving content.
Figure 9:
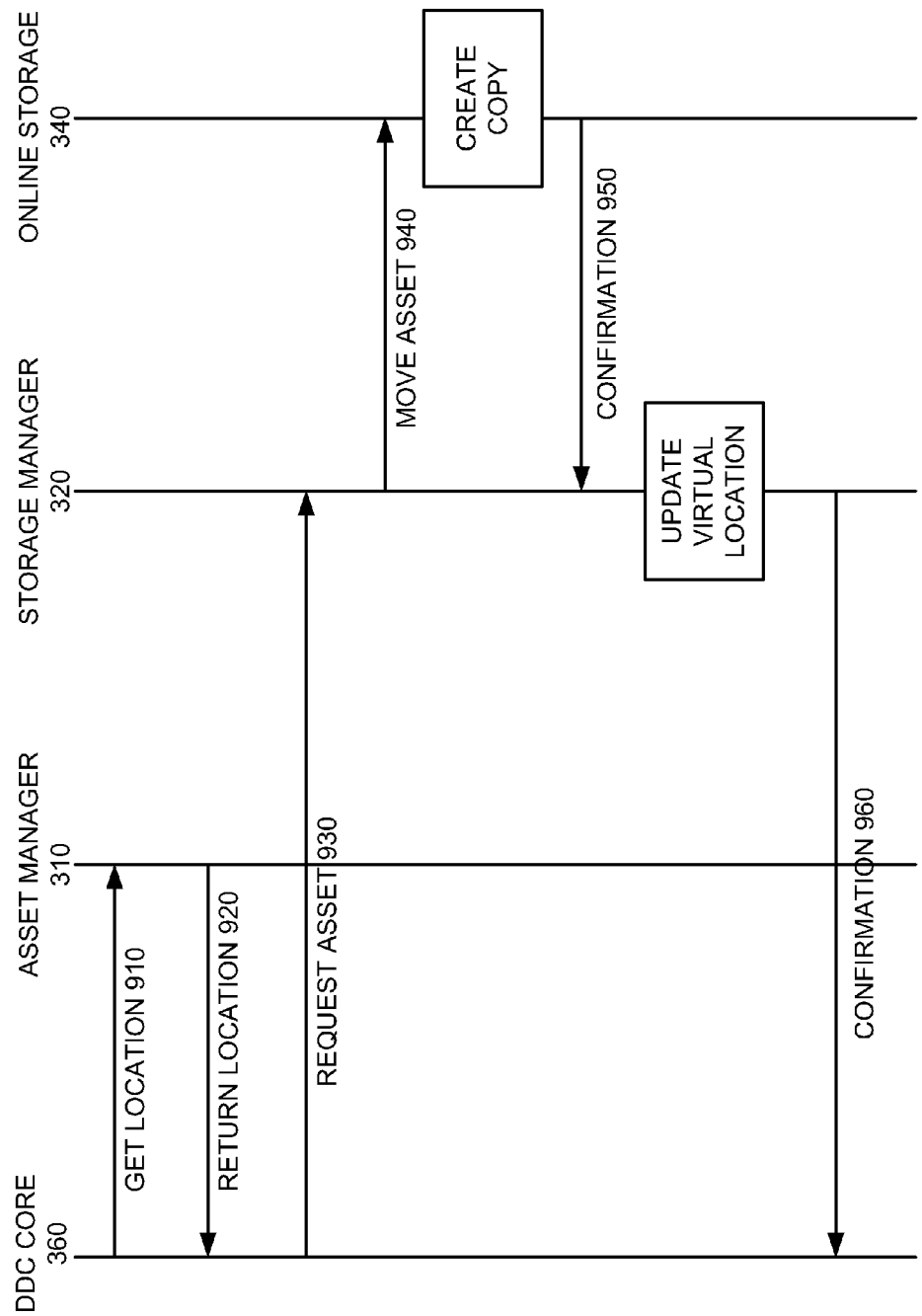
FIG. 9 is a signal flow diagram associated with the processing of FIG. 8.

As described above, storage manager 320 may manage the retrieval of assets associated with DDC 150. For example, FIG. 8 is an exemplary flow diagram illustrating processing associated with retrieving content. FIG. 9 is a signal flow diagram associated with the processing of FIG. 8 and is described in conjunction with FIG. 8.

FIG. 8 is an exemplary flow diagram illustrating processing associated with retrieving content from storage. FIG. 9 is a signal flow diagram associated with the processing of FIG. 8 and is described in conjunction with FIG. 8. Processing may begin with DDC core 360 identifying an asset for retrieval (block 810). For example, DDC core 360 may determine that a customer order requests that a particular content/file be provided in a particular format. In some instances, DDC core 360 may receive an order to transform content that has been previously processed into a different format. In this case, DDC core 360 may identify that it is faster to use a previously processed asset as a starting point for the new customer order, as opposed to using an originally received asset as a starting point for the new customer order.

For example, a customer order may be to transcode a particular asset provided in MP2 format into a windows media video (WMV) format. DDC core 360 may identify that the asset is already stored in DDC 150 (e.g., online storage 340) in an audio video interleave (AVI) format. DDC core 360 may further determine that it is more efficient (e.g., faster and/or less expensive) to use the AVI formatted asset as the starting point for the customer order, as opposed to using the MP2 formatted content. In this example, DDC core 360 may wish to retrieve the already processed asset stored in AVI format. In other implementations, DDC core 360 may wish to retrieve an asset for further processing, such as for inserting a new trailer into the content, adding advertisements into the content, etc.

In each case, DDC core 360 may request the location of an asset (block 810). For example, DDC core 360 may invoke a call to asset manager 310 to retrieve the location of the asset that is to be made available in working storage for processing (FIG. 9, 910). The call from DDC core 360 may include a virtual location or a virtual location identifier (ID) associated with the last location of the asset of which DDC core 360 was aware (e.g., the virtual location provided by storage manager 320 when the asset was first stored). In other instances, the request from DDC core 360 may include a title and/or other information associated with the requested asset, such as format type associated with the stored asset. Specifying the format type may allow storage manager 320 to ensure that it returns the desired asset to DDC core 360 in situations where the same asset is stored in multiple formats.

Asset manager 310 may receive the request and identify the current virtual location of the asset (block 820). Asset manager 310 may also provide the virtual location of the content to DDC core 360 (920).

DDC core 360 may then communicate with storage manager 320 to move the asset to working storage. For example, DDC core 360 may invoke a web service call to storage manager 320 requesting that the asset at the identified virtual location be made available in working storage of online storage system 340 (block 830; 930).

Storage manager 320 receives the request and resolves the virtual location of the asset to an actual physical location of the asset (e.g., particular storage device and/or location within that storage device). Storage manager 320 may then forward a request to online storage 340 to move the asset at the identified physical location to working storage (940). Assume that the asset is stored in online storage 340. In this case, storage manager 320 may invoke a web service call to online storage 340, via online storage interface 520, requesting that the asset be moved to working storage. Online storage 340 receives the request, creates a copy of the requested asset and stores the copy in working storage (block 840). For example, the asset may exist in mezzanine storage. In this case, online storage system 340 may create a copy of the asset stored in mezzanine storage of online storage 340 and store the copy in working storage of online storage 340 (block 840).

Online storage system 340 may also transmit a confirmation to storage manager 320 upon successful creation of the copy in working storage (950). The confirmation from online storage system 340 may include information specifying the physical location of the copy located in working storage.

Storage manager 320 may receive the confirmation and update its database with an updated virtual location to physical location association (block 850). For example, storage manager 320 may update the virtual location of the asset to reference the working storage physical locations of the asset. Storage manager 320 may also continue to store the virtual location of the asset stored in mezzanine storage.

Storage manager 320 may also forward a successful confirmation to DDC core 360 indicating that content is available in working storage for processing (block 850; 960). Storage manager 320 may also forward the content to DDC core 360 for further processing (block 860). For example, storage manager 320 may forward the requested content to the appropriate system in DDC core 360 for further processing and/or distribution. In this manner, DDC core 360 may request an asset for further processing, distribution, etc. In each case, components of DDC core 360 interface with storage manager 320 without having to directly interface with storage components that may communicate via different protocols. This provides an efficient mechanism via which DDC core 360 can retrieve assets.

In some implementations, an ingested asset may be retrieved from archive storage 350. For example, in some cases, DDC core 360 may forward a request for an asset located in archive storage 350. In this case, the processing may proceed in a similar manner as described above with respect to FIG. 8 and FIG. 9. That is, DDC 360 may obtain the location of the asset from asset manager 310 and send a request for the asset to storage manager 320. However, in this scenario, storage manager 320 may determine that the requested asset is in archive storage 350. Storage manager 320 may then generate a copy of the asset stored in archive storage 350 and store the copy in working storage of online storage 340. Storage manager 320 may also create a virtual location for the stored asset and return a confirmation as described above with respect to FIGS. 8 and 9.

Figure 10:
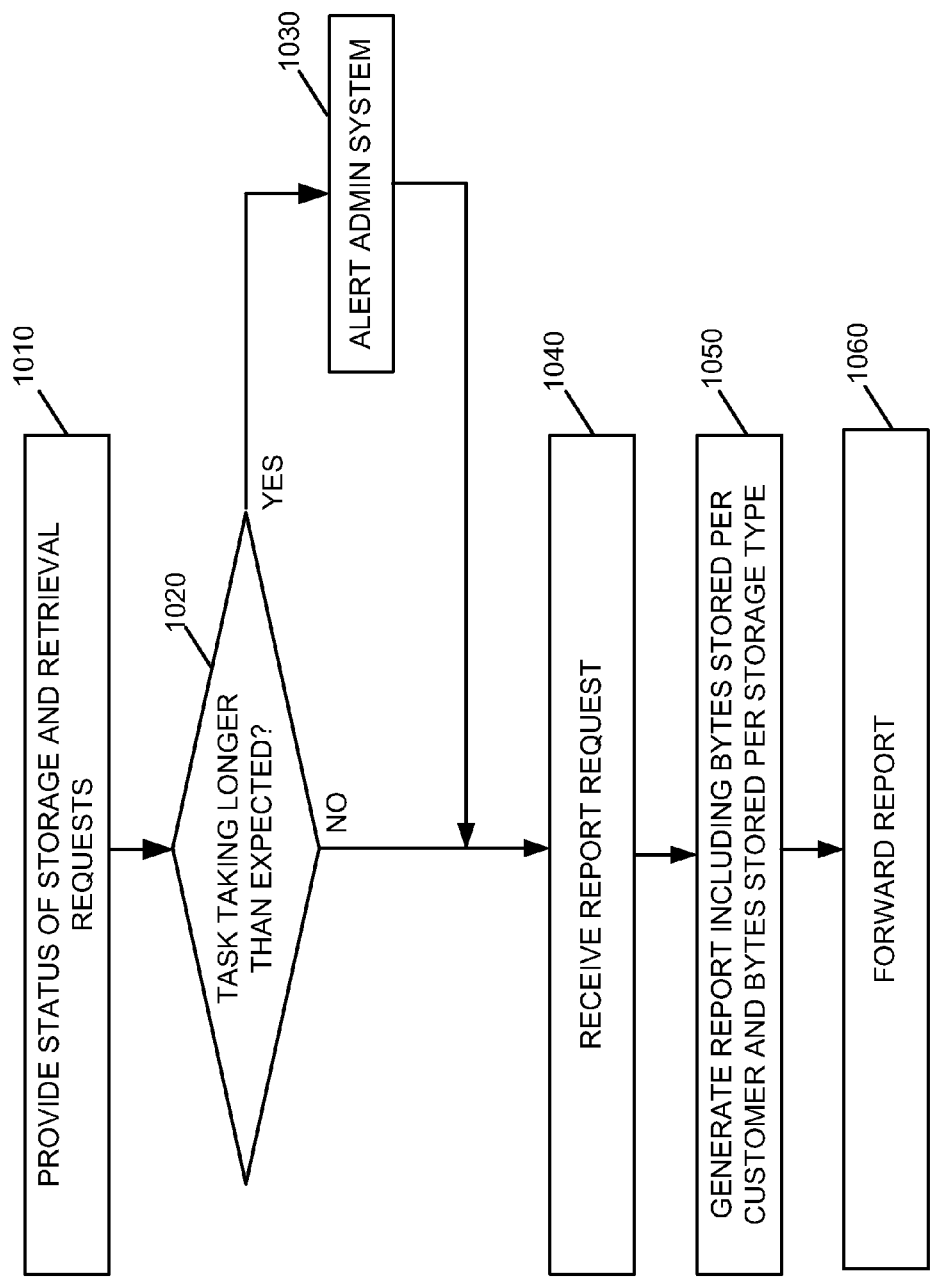
FIG. 10 is a flow diagram illustrating exemplary processing associated with monitoring requests and generating reports associated with stored content.

As also described above, storage manager 320 may monitor various requests and also track assets stored in DDC 150. FIG. 10 is an exemplary flow diagram illustrating processing associated with monitoring assets and generating reports. Processing may begin with storage manager 320 tracking the status of various requests and providing the status of storage and retrieval requests to administrative personnel (block 1010). For example, personnel at administration portal 330 may automatically receive the status of pending storage and retrieval requests. The status information may include pending, in-process, completed, scheduled, etc.

Storage manager 320 may determine if any particular task is taking longer than expected (block 1020). For example, storage administration logic 570 may store information indicating an estimated time for retrieving content and an estimated time for storing content. If storage manager 320 determines that a particular task is taking longer than expected (block 1020—yes), storage manager 320 may send an alert to administration portal 330 (block 1030). Personnel at administration portal 330 may then initiate measures to determine the problem. Processing associated with FIG. 10 may continue at block 1040. If storage manager does not identify any task taking longer than expected (block 1020—no), processing may continue at block 1040.

Assume that storage manager 320 receives a report request (block 1040). For example, assume that personnel at administration portal 330 send a request for a report identifying the number of bytes stored per customer. In this case, storage administration logic 570 may generate a report for each customer indicating the total number of bytes of content stored for that customer (block 1050). Storage administration logic 570 may also include in the report information that identifies the number of bytes stored for each customer by storage type (block 1050). For example, storage administration logic 570 may indicate the number of bytes of content for a particular customer that are stored in online storage 340 and the number of bytes, for that particular customer, stored in archive storage 350. Storage administration logic 570 may then forward the report to administration portal 330 (block 1060).

Storage administration logic 570 may also generate other types of reports, such as reports indicating the cost for storing content in online storage 340 and archive storage 350. In some implementations, storage administration logic 570 may generate recommendations to customer/administration personnel to move content to reduce costs associated with stored content. In other implementations, storage manager 320 may automatically move assets between different storage areas to reduce costs for customers.

Implementations described herein include an infrastructure that provides for efficient storage of processed content, as well as the retrieval of stored content. The infrastructure allows components associated with processing content to store and retrieve content without having to identify protocols or other requirements, such as communication requirements, associated with the actual storage devices/systems. The storage management system also moves content between storage systems and deletes content, as necessary to meet customer requirements. The storage management system also is able to generate reports associated with stored content to allow customers and/or personnel associated with the infrastructure to view detailed information regarding the stored content.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to components of DDC 150 performing various tasks to process orders, store content and retrieve content. In other implementations, other components, systems, platforms, etc., in DDC 150 may perform some or all of these tasks. For example, in some implementations, functions of asset manager 310 and storage manager 320 may be combined in a single system/platform.

In addition, orders associated with processing a media file, such as transcoding a media file from one format to another format have been briefly described above. It should be understood that other types of orders may be processed by DDC 150. For example, other types of orders may include inserting advertisements or logos into a media file, concatenating a second media file to the media file (e.g., concatenating episodes of a series together), inserting black space into at least a portion of the media file, performing audio transcoding on the media file, etc.

Features have also been described with respect to storage manager 320 managing the storage and retrieval of assets located at two main storage systems (e.g., online storage 340 and archive storage 350). In other implementations, storage manager 320 may manage the storage, retrieval, monitoring, etc., of assets stored in any number of storage locations, such as multiple local or online storage locations, multiple archive storage locations and/or multiple cloud storage locations.

Further, while series of acts have been described with respect to FIGS. 6, 8 and 10 and various signal flows with respect to FIGS. 7 and 9, the order of the acts and signal flows may be varied in other implementations. Moreover, non-dependent acts and/or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
identifying, by a media processing system, a media file to be retrieved from storage for transcoding by the media processing system;
transmitting a request, to an asset manager device, for information identifying a location of the media file;
identifying, by the asset manager device, the location of the media file;
forwarding, to the media processing system, information identifying the location;
transmitting, to a storage manager device, a request for the media file;

receiving, by the storage manager device, the request for the media file;
creating, by the storage manager device, a copy of the media file;
storing, by the storage manager device, a first virtual location corresponding to a location of the copy of the media file;
forwarding, by the storage manager device and to the media processing system, a message indicating that the identified media file is available for processing;
forwarding, by the storage manager device, the copy of the media file to the media processing system;
transcoding the media file from a first format into at least one other format;
at least two of:
  inserting an advertisement or a logo into the media file,
  concatenating a second media file to the media file,
  inserting black space into at least a portion of the media file, or
  performing audio transcoding on the media file;
monitoring, by the storage manager device, the copy of the media file in a working storage portion of memory; and
automatically deleting the copy, in response to determining that the copy has not been accessed in a predetermined period of time.

2. The method of claim 1, further comprising:
storing, by the storage manager device, the copy of the media file in the working storage of a first storage system located internally with respect to the media processing system.

3. The method of claim 2, wherein the first virtual location corresponds to the location of the copy of the media file in the working storage of the first storage system.

4. The method of claim 3, further comprising:
storing, by the storage manager device, a second virtual location corresponding to a location of the media file in the first storage system or a location of the media file in an archive storage system located externally with respect to the media processing system.

5. The method of claim 1, further comprising:
monitoring, by the storage manager device, a first plurality of media files stored in a first storage system;
determining that at least some of the first plurality of media files have not been accessed in a first predetermined period of time; and
automatically moving, by the storage manager device, the at least some of the first plurality of media files from the first storage system to a second storage system located externally with respect to the media processing system in response to the determining.

6. The method of claim 5, further comprising:
monitoring, by the storage manager device, a second plurality of media files stored in the second storage system;
determining that at least some of the second plurality of media files have not been accessed in a second predetermined period of time, wherein the second period of time is greater than the first period of time; and
automatically deleting, by the storage manager device, the at least some of the second plurality of media files from the second storage system in response to the determining that at least some of the second plurality of media files have not been accessed in the second predetermined period of time.

7. The method of claim 1, further comprising:
storing a plurality of media files in a plurality of storage systems; and
generating, by the storage manager device, a report associated with the plurality of media files, wherein the report includes:
  information identifying a total number of bytes of content stored for a first customer, and
  information identifying at least one of a number of bytes of content stored for the first customer in each of the plurality of storage systems or a number of bytes of content stored for the first customer per storage type.

8. A system, comprising:
a media processing system configured to process media files, wherein the media processing system comprises a transcoder; and
a storage manager system comprising a processor configured to:
  communicate with the media processing system to store a plurality of media files processed by the media processing system,
  monitor accesses and lack of accesses to each of the plurality of media files,
  manage movement of the plurality of media files between a plurality of different storage systems based on the monitoring,
  delete at least some of the plurality of media files in response to determining that the at least some of the plurality of media files have not been accessed within a first predetermined period of time,
  receive a request for retrieval of a first one of the plurality of media files, and
  forward the requested first media file to the media processing system,
wherein the media processing system is further configured to:
  transcode the first media file from a first format into at least one other format using the transcoder, and
  at least two of:
    insert an advertisement or a logo into the first media file,
    concatenate a second media file to the first media file,
    insert black space into at least a portion of the first media file, or
    perform audio transcoding on the first media file,
wherein when monitoring the accesses and lack of accesses, the processor is configured to:
  monitor a second plurality of media files stored in a first one of the plurality of different storage systems, and
  determine that at least some of the second plurality of media files have not been accessed within a second predetermined period of time; and
wherein when managing movement, the processor is configured to:
  automatically move the at least some of the second plurality of media files from the first storage system to a second one of the plurality of different storage systems, in response to determining that the at least some of the second plurality of media files have not been accessed within the second predetermined period of time.

9. The system of claim 8, wherein the storage manager is further configured to:
generate a copy of the first media file in response to the request for retrieval, and wherein when forwarding the requested first media file, the storage management system is configured to:
forward the copy of the first media file.

10. The system of claim 8, wherein the first storage system is configured to store a first portion of the plurality of media files and the second storage system is configured to store a second portion of the plurality of media files, wherein the first storage system is accessible via an internal network associated with the media processing system and the second storage system is accessible via a network that is external to the media processing system.

11. The system of claim 8, further comprising:
an asset manager system configured to store virtual locations corresponding to physical locations of the plurality of media files.

12. The system of claim 8, wherein the storage manager system is further configured to:
generate a report associated with the plurality of media files, wherein the report includes at least one of:
information identifying a total number of bytes of content stored for a first customer, or
information identifying a number of bytes of content stored for the first customer in each of the plurality of storage systems.

13. The system of claim 8, wherein the media processing system is further configured to:
determine that the first media file is usable for processing a customer order,
forward the request for the first media file to the storage manager system, wherein the request identifies a virtual location of the first media file, and
receive the first media file from the storage manager system.

14. The system of claim 8, wherein the storage manager system is further configured to:
monitor execution of storage requests and retrieval requests received from the media processing system,
determine, based on the monitoring, that at least one storage or retrieval request is taking longer than expected to complete, and
provide a notification to an administration system that the at least one storage or retrieval request is taking longer than expected to complete.

15. A method, comprising:
receiving, by a media processing system, orders associated with processing a plurality of media files;
identifying, by the media processing system, a plurality of tasks associated with processing each of the orders;
executing, by the media processing system, the plurality of tasks associated with each of the orders;
wherein the executing the plurality of tasks for a first one of the orders associated with a first one of the plurality of media files includes at least two of:
inserting an advertisement or a logo into the first media file,
concatenating a second media file to the first media file,
inserting black space into at least a portion of the first media file, or
performing audio transcoding on the first media file;
storing, by a storage processing system, the plurality of media files after executing the orders;
monitoring, by the storage processing system, accesses and lack of accesses to each of the plurality of media files;
managing, by the storage processing system, movement of the plurality of media files between a plurality of different storage systems based on the monitoring; and
deleting at least some of the plurality of media files in response to determining that the at least some of the plurality of media files have not been accessed within a first predetermined period of time.

16. The method of claim 15, further comprising:
receive a request, from the media processing system, for retrieval of a first one of the plurality of media files, wherein the request includes a virtual location corresponding to a physical location of the first media file; and
forwarding, by the storage processing system, the requested first media file to the media processing system.

17. The method of claim 15, wherein the managing movement of the plurality of media files comprises
automatically moving a first number of the plurality of media files from a first one of the storage systems to a second one of the storage systems, in response to determining that the first number of media files have not been accessed within a second predetermined period of time, wherein the second predetermined period of time is less than the first predetermined period of time.

18. The method of claim 17, wherein the first storage system is located internally with respect to the media processing system and the second storage system is located externally with respect to the media processing system.

* * * * *